United States Patent [19]
Hubbard et al.

[11] 4,185,844
[45] Jan. 29, 1980

[54] FUEL TANK FILLER TUBE ASSEMBLY

[75] Inventors: Earl Hubbard, Madison Heights; Robert J. Kartanys, Royal Oak, both of Mich.

[73] Assignee: Chrysler Corporation, Highland Park, Mich.

[21] Appl. No.: 899,685

[22] Filed: Apr. 24, 1978

[51] Int. Cl.² ............................................. B67C 3/00
[52] U.S. Cl. .................................... 280/5 A; 141/348; 220/86 R; 296/1 C
[58] Field of Search ...................... 280/5 A; 296/1 C; 220/86 R; 141/348

[56] References Cited
U.S. PATENT DOCUMENTS

| | | | |
|---|---|---|---|
| 2,138,104 | 11/1938 | Kellogg | 220/86 R |
| 2,779,498 | 1/1957 | Cole et al. | 220/86 |
| 3,098,579 | 7/1963 | Wheaton | 220/310 X |
| 3,133,564 | 5/1964 | Hunter | 220/86 R X |
| 3,159,409 | 12/1964 | Koehler | 220/86 R X |
| 3,628,577 | 12/1971 | Kruis | 220/86 R X |
| 3,633,609 | 1/1972 | Benner et al. | 280/5 A |
| 3,838,713 | 10/1974 | Tubbs | 138/121 X |
| 3,856,316 | 12/1974 | Badberg | 280/5 A |
| 3,911,977 | 10/1975 | Berger | 141/348 |
| 3,913,639 | 10/1975 | Davis | 220/86 R X |
| 3,942,564 | 3/1976 | Nakazato | 141/348 |
| 4,034,784 | 7/1977 | Ball et al. | 220/86 R X |

Primary Examiner—Allan N. Shoap
Attorney, Agent, or Firm—Baldwin & Newtson

[57] ABSTRACT

A filler tube assembly for a fuel tank of an automotive vehicle fabricated as an aluminum tube interference fit to a plastic housing through use of magnetic force having a flexible vent tube extending between the housing and the end of the tube to be inserted in the fuel tank.

4 Claims, 6 Drawing Figures

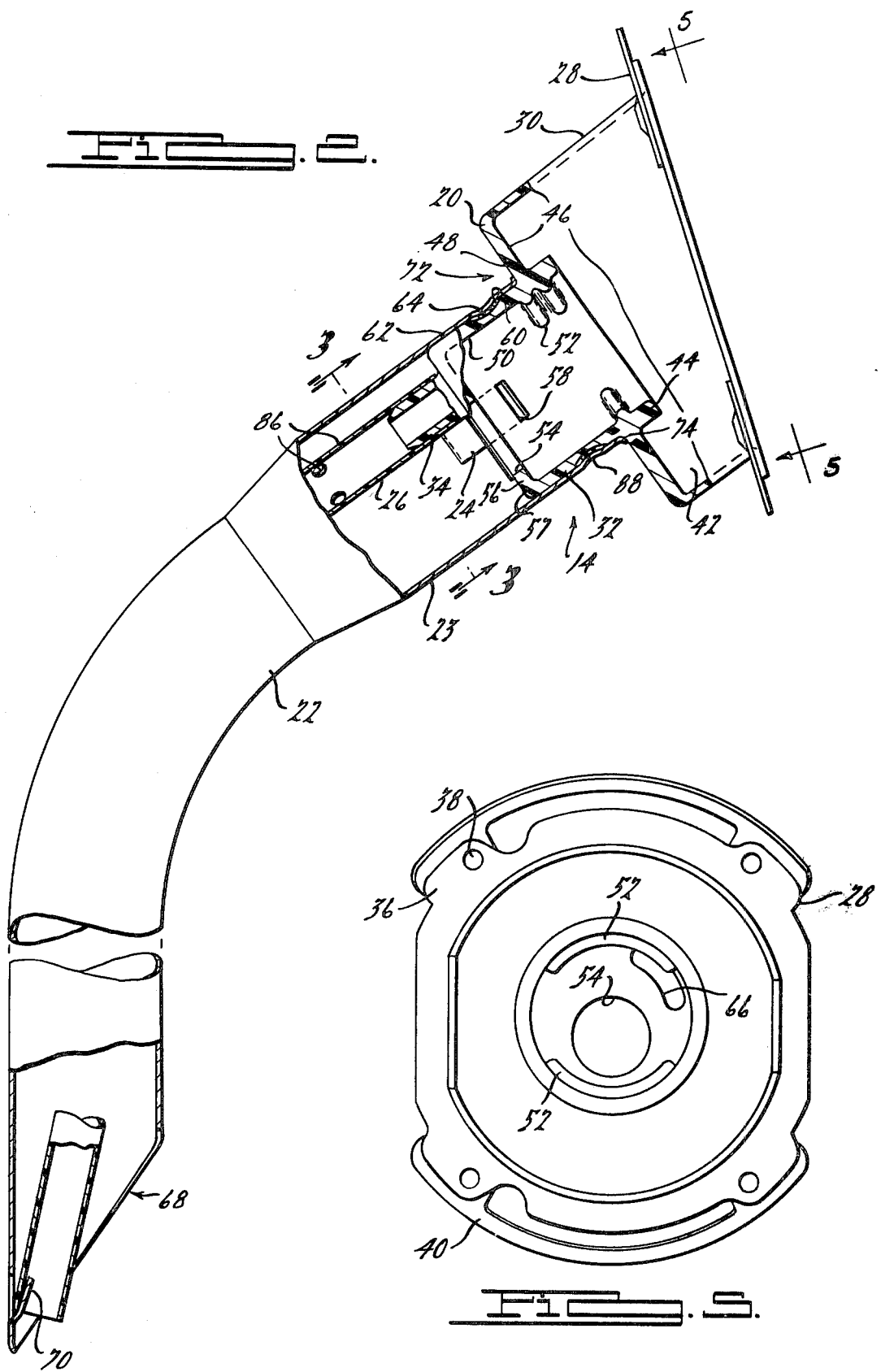

FUEL TANK FILLER TUBE ASSEMBLY

BACKGROUND OF THE INVENTION

1. Field of Invention

The present invention relates to fuel filler tube assemblies for vehicular mounted fuel tanks.

2. Description of the Prior Art

Fuel filler tube assemblies currently in widespread use by the automotive industry generally consist of a large number of parts, usually fabricated from ferrous metals. A fuel delivery tube is secured to the fuel tank and extends to a position proximate a wall of the vehicle body. The tube is formed with a sheet metal baffle plate dividing it into upper and lower sections to provide separate liquid and vapor paths from the tank. Because of governmental restrictions on the use of leaded fuels the end of the tube remote from the tank generally terminates in one of many well-known multipiece restrictor assemblies to prevent introduction of substantial quantities of leaded fuel into the tank. The restrictor assembly, in turn, is generally secured as by welding to a relatively rigid mounting flange housing which is attached to a portion of the vehicle body.

While the prior art filler tube assemblies described have been functionally adequate, certain disadvantages have been recognized. First, the use of a large number of parts to perform the fuel delivery function is not economically desirable or cost effective. Second, the prevailing use of ferrous parts results in a heavy assembly and leads to requirements for laborious and uneconomical corrosion protection. Finally, the use of rigid fuel tube mounting structures may prove undesirable in certain conditions of inadvertent use which may require withstanding certain mechanical impacts.

SUMMARY OF THE INVENTION

Responsive to the disadvantages of the prior art fuel filler tube assemblies, it is an object of the present invention to provide an assembly that is simple in construction and provides a reduced number of parts formed of light, corrosion resistant materials.

It is another object to provide non-rigid means for mounting the assembly.

These objects are achieved in a simple structure in which a housing and a tube are joined in compressive sealing engagement.

BRIEF DESCRIPTION OF THE DRAWINGS

These and other objects of the present invention will be apparent to those skilled in the art upon reading the following detailed description of a preferred embodiment with reference to the accompanying drawing in which:

FIG. 2 is an enlarged, partially sectional view of the filler tube assembly of the present invention, truncated for clarity;

FIG. 5 is an end view of the housing member of the fuel filler tube assembly of the present invention viewed in the direction of the arrows 5—5 of FIG. 2.

DESCRIPTION OF THE PREFERRED EMBODIMENT

Figure 1:
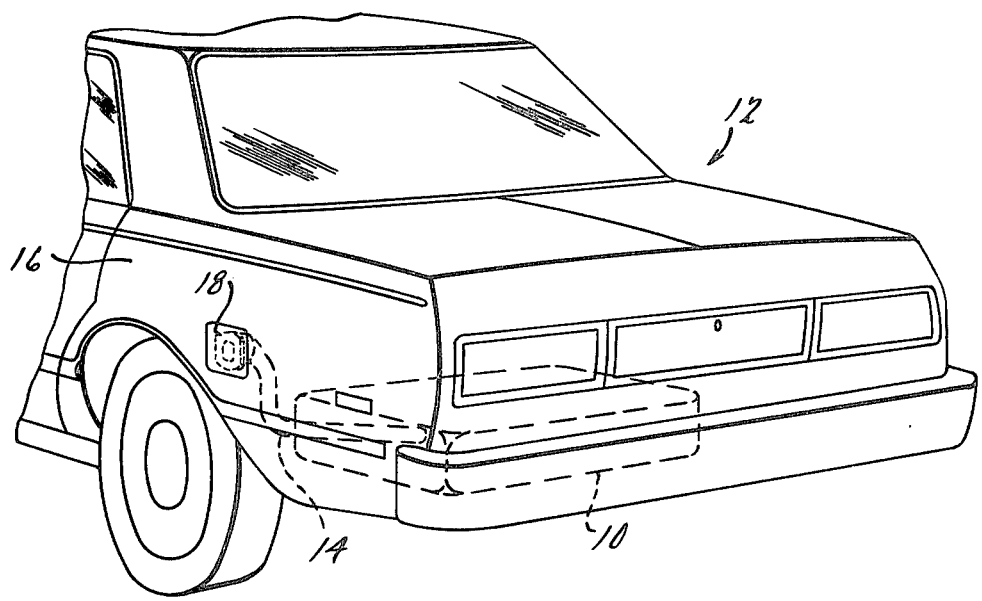
FIG. 1 is a partial rear prospective view of a vehicle in which the filler tube assembly of the present invention is shown in phantom.

Referring now to the drawings and in particular to FIG. 1, a fuel tank 10 is illustrated as being installed by means not shown in a vehicle 12. The fuel filler tube assembly 14 of the present invention is arranged to provide fluid communication between the tank 10 and the exterior surface 16 of the vehicle. A threaded cap 18 closes the exterior end of the filler tube assembly 14.

Turning next to FIG. 2, the invention filler tube assembly 14 is illustrated as consisting essentially of a housing 20, a fuel delivery tube 22, a leaded fuel restrictor element 24, and a vent tube 26.

The housing 20 is preferably formed from a plastic such as an acetal as by injection molding or other process and includes a thin annular mounting flange portion 28, a thicker, generally cylindrical body portion 30 extending at some convenient angle from the mounting flange portion 28, a generally cylindrical mounting boss portion 32, and a vent tube mounting boss 34.

In the preferred embodiment shown, the mounting flange portion 28 includes four circumferentially spaced mounting ears 36, each having a mounting hole 38 formed through it. A pair of braces 40, preferably formed of a high strength material such as steel, bridge two pairs of ears 36 engaging the flange portion 28 only at these surfaces, as may best be seen in FIG. 5, to provide structural rigidity. Holes (unnumbered) formed through the braces 40 register with the holes 38 to permit insertion of fasteners such as screws (not shown) for attachment of the housing 20 to the body of the vehicle 12. It can be appreciated that owing to the described frangible construction of the flange portion 28, impact loading for example, from an accident, of the fuel delivery tube 22 will tend to result in shearing the mounting ears 36 permitting certain movement of the fuel delivery tube without potentially hazardous rupture thereof.

The body portion 30 defines a pocket 42 of generally circular cross section for receiving the cap 18 or similar closure device. An upstanding annular flange 44 may be approximately centrally formed at the inner wall 46 to abuttingly engage the cap 18 in a known manner.

Figure 4:
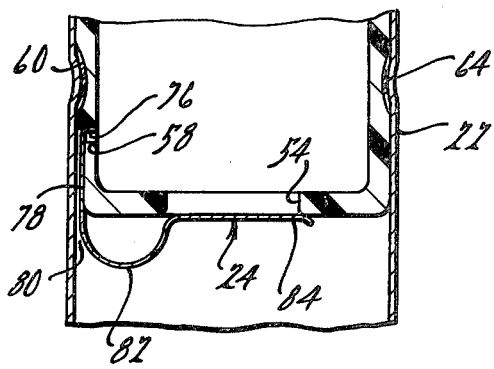
FIG. 4 is a cross-sectional view taken along line 4—4 of FIG. 3.

The mounting boss 32 is formed as a cup-like protrusion extending coaxially with the flange 44 from the rear surface 48 of the housing portion 30. Its inner diameter 50 includes integrally formed threads 52 which may extend into the flange 44 for receiving the cap 18. A passage which may be a circular hole 54 is formed through the inner terminating wall 56 for permitting the delivery of fuel to the tank 10, and a slot 58 is formed normal to the axis of the boss 32. A shallow annular groove 60 is formed in the outer diameter 62 of the boss 32 to receive an elastomeric sealing member 64, which may best be seen in FIG. 4.

The sealing member 64 is fabricated as a substantially tubular member and assumes the shape shown in the drawings upon assembling the filler tube 22 to the mounting boss 32 in the manner to be described.

Figure 3:
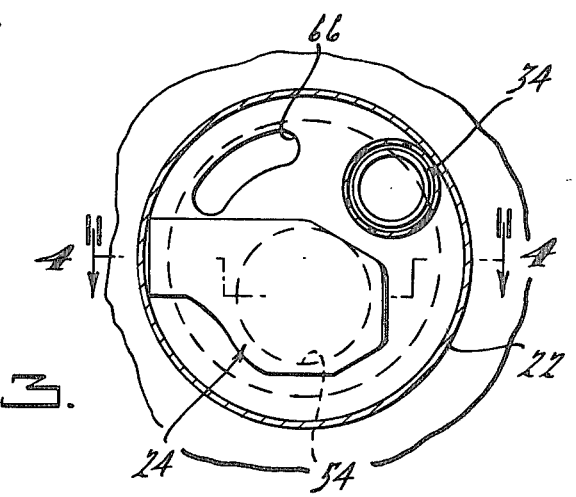
FIG. 3 is a cross-sectional view taken along line 3—3 of FIG. 2.

Also formed through the wall 56 is a vent passage 66 which is illustrated as a kidney shaped port in FIGS. 3 and 5. This passage permits the escape of air and fuel vapor when the tank 10 is filled by insertion of a conventional fuel nozzle (not shown) through and substantially blocking the fuel delivery passage 54.

The vent tube mounting boss 34 is preferably formed as a blind cylinder extending inwardly from the rear surface 57 of inner wall 56 parallel to the axis of the mounting boss 32 and radially offset from the passage 54.

Turning now to the fuel delivery tube 22, it is preferably formed of a relatively low strength metal such as aluminum and has circular cross section. The inner end 68 of the tube 22 may be of reduced cross section for insertion into the tank 10 and includes a preferably integral retaining barb 70 positioned proximate its terminus for retaining the inner end of the vent tube 26. The outer end 72 of the tube 22 is sized to be received in slip fit relationship over the outer diameter 62 of mounting boss 32 and the sealing member 64 to the position shown in FIG. 2 wherein its outer face 74 abuts the rear face 48 of the housing portion 30. Final assembly technique and axial retention of the parts in the position shown in FIG. 2 will be discussed as the description progresses.

The leaded fuel restrictor member 24 is, together with the seal member 64 trapped between the fuel delivery tube 22 and the mounting boss 32 of housing 20. As may best be seen in FIG. 4, the restrictor member 22 includes a tab portion 76 received in the slot 58 of mounting boss 32, a straight retaining portion 78 carried in the annular space 80 (which may be formed by grooving the boss 32) between the fuel delivery tube 22 and the mounting boss 32 of housing 20. As may best be seen in FIG. 4, the restrictor member 22 includes a tab portion 76 received in the slot 58 of mounting boss 32, a straight retaining portion 78 carried in the annular space 80 (which may be formed by grooving the boss 32) between the fuel delivery tube 22 and the mounting boss 22, a curved hinge portion 82, and a flat door portion 84 which substantially covers the fuel delivery passage 54 in the installed position shown. A restrictor element such as that shown at 22 must be included in most vehicles produced in the United States to prevent introduction of significant quantities of leaded fuel into the fuel tanks of vehicles using catalytic converters. Unleaded fuel nozzles in service stations are sized to have smaller diameters than the vehicle fuel delivery passage such as passage 54. Insertion of the nozzle mechanically displaces the door portion 84 to swing away and permit fueling. Larger leaded nozzles will bottom outside the passage 54 and the restrictor 22 will remain in the closed position shown in FIG. 4. It should be noted that the cooperation of the tab portion 76 and the retaining portion 78 of the restrictor member 24 with the fuel delivery tube 22 and the mounting boss 32 of housing 20 arranges the parts to perform the required function without use of any added tensioning devices or fasteners, thereby enhancing the economic desirability of the invention fuel filler tube assembly 14.

Turning last to the vent tube 26, it is formed of a flexible material such as nylon and has a continuous circular cross section. It is received in force fit relationship over the cylindrical vent tube mounting boss 34 of the housing 20. It includes a plurality of radially extending through holes 56 positioned proximate its outer end for permitting fuel vapor to exit from the tank 10. As was described before the inner end of the vent tube 26 is received over the barb 70 at the inner end of the fuel delivery tube 22.

It can be noted by reference to the drawings and the written description as it has thus far progressed the filler tube assembly 14 is assembled to the configuration shown best in FIG. 2 without the use of threaded fasteners welding, or other convention assembly expedients. This is accomplished by locally deforming the fuel delivery tube at 88 where it registers with the seal member 64 and the annular groove 60 in the mounting boss 32 of housing 20.

According to the preferred method of effecting this local deformation, during fabrication of the invention filler tube assembly the tube 22 is assembled to the bottomed position described and magnetic force inducing dies are brought into a surrounding relationship at an axial position registering with the annular groove 60 of the mounting boss 32. An electromagnetic field is then established by a known process such as that described in "Welding and Metal Fabrication", March, 1969 at pp. 102–106, which exerts a crushing force inward on the outer diameter 73 of the outer portion 72 of fuel delivery tube 22. This causes the tube 22 to take the shape illustrated at 88 in FIGS. 2 and 4 and the seal member 64 to assume the compressively sealing configuration likewise there shown.

In one example successfully fabricated by the applicant, the housing was formed of Acetal with the mounting boss 32 having an outer diameter of 2.136/2.126 inches and a wall thickness of 0.136 inches. The fuel delivery tube 22 was formed of aluminum having an inner diameter at 72 of 2.145/2.155 inches and a wall thickness of 0.043 inches minimum. A magnetically generated force of 3.5 kilo-joules was applied to achieve the assembled configuration shown.

Figure 6:
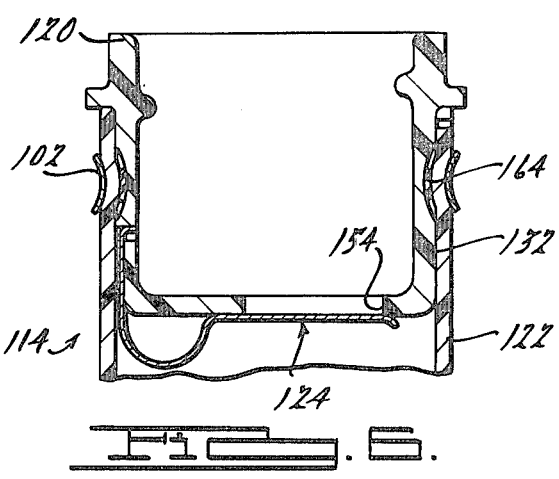
FIG. 6 is a partial cross-sectional view of an alternative embodiment of the present invention.

Turning now to FIG. 6, an alternative embodiment of the invention filler tube assembly is shown in which both the housing 120 and the fuel delivery tube 122 are formed of resilient non-metallic materials and the parts are compressively urged together into sealing engagement through deformation of a metallic ring 102 which registers axially with the seal 164. This results in an even lighter structure than the first described embodiment since the use of metallic structure needed to effect compressive deformation by magnetically generated force is minimized.

While only two embodiments of the invention filler tube assembly have been shown and described, those skilled in the art of automotive fuel filler tube assemblies well appreciate that others are possible without departing from the scope of the appended claims.

What is claimed is:

1. A filler tube assembly for a fuel tank installed in a vehicle, the assembly comprising:
   A. a housing having a fuel delivery passage formed therethrough and having flange means for fixedly attaching to a portion of the body of the vehicle;
   B. a fuel delivery tube secured to said housing at one end and providing wall means for connection to the fuel tank at the other end;
   C. vent tube connecting means defining a cylindrical vent tube mounting boss extending from said housing into said fuel delivery tube;
   D. vent tube retaining means integrally formed with said fuel delivery tube on its inner periphery adjacent said other end; and
   E. a flexible vent tube flexibly insertable within said fuel delivery tube and received in interference sealing engagement with said vent tube boss at its one end and received for retention at its other end by said retaining means.

2. A filler tube assembly for a fuel tank installed in a vehicle, the assembly comprising:

A. a unitary housing formed of a relatively flexible material, having a fuel delivery passage formed therethrough including means for effecting attachment to a portion of the body of the vehicle, and including a substantially cylindrical mounting boss extending from one end thereof;

B. a one-piece fuel delivery tube formed to define a curvilinear fuel delivery passage of substantially circular cross section having a first end providing means for insertion into the fuel tank and a second end being received in interference fit sealing relationship over said cylindrical boss to effect fluid communication between said fuel delivery passage and said one end; and C. an elongated vent tube flexibly insertable from said fuel delivery tube second end to follow said curvilinear fuel delivery passage substantially through its entire length to effect communication of fuel vapor between said fuel delivery tube first and second ends, said vent tube attaching at one end to a vent tube boss located within the periphery of said mounting boss and extending inwardly in a direction toward said first end.

3. A filler tube assembly for a fuel tank installed in a vehicle, the assembly comprising:

A. a housing having a fuel delivery passage formed therethrough and including a radially extending annular mounting flange portion comprising a plurality of circumferentially spaced, outwardly extending, readily frangible mounting ears having aperture means for receiving a corresponding plurality of fasteners for effecting attachment to the body of the vehicle;

B. a fuel delivery tube secured to said housing at one end and providing means for connection to the fuel tank at the other end; and C. brace means abuttingly engaging said ears and the body and circumferentially connecting adjacent pairs of said ears to effect structural rigidity of said assembly.

4. A filler tube assembly for a fuel tank installed in a vehicle, the assembly comprising:

A. a housing member having:
1. a mounting flange portion including a plurality of circumferentially spaced, readily frangible mounting ears and means for attaching said ears to a portion of the body of the vehicle;
2. a substantially cylindrical mounting boss extending inwardly toward said fuel tank away from said mounting flange portion and having a fuel delivery passage and a vent passage formed therethrough; and
3. a substantially cylindrical vent tube boss extending inwardly toward said fuel tank from said mounting boss and within the periphery of said mounting boss;

B. a unitary fuel delivery tube having one end received over and compressively sealingly engaging said housing mounting boss, its other end insertable in said fuel tank to effect communication between said fuel delivery passage and said fuel tank, and having a retaining barb integrally formed on its inner periphery proximate said other end; and C. a flexibly insertable vent tube for effecting vapor communication between said fuel tank and said housing vent passage, the tube having:
1. a first end received in press fit relationship over said vent tube boss;
2. a plurality of radially extending vent passages formed through said vent tube adjacent said first end; and
3. a second end engaging said delivery tube retaining barb.

* * * * *